United States Patent [19]
Kissel

[11] Patent Number: 5,593,955
[45] Date of Patent: *Jan. 14, 1997

[54] METHOD FOR REDUCING THE POUR POINT OF AN OIL AND COMPOSITIONS FOR USE THEREIN

[75] Inventor: Charles L. Kissel, Anaheim, Calif.

[73] Assignee: Entek Corporation, Brea, Calif.

[ * ] Notice: The portion of the term of this patent subsequent to Dec. 21, 2014, has been disclaimed.

[21] Appl. No.: 360,380

[22] Filed: Dec. 21, 1994

[51] Int. Cl.$^6$ .......................... E21B 37/06; E21B 43/22
[52] U.S. Cl. .................. 507/239; 507/240; 507/244; 507/256; 166/304
[58] Field of Search .................. 166/304; 507/239, 507/240, 244, 256

[56] References Cited

U.S. PATENT DOCUMENTS

| | | | |
|---|---|---|---|
| 1,844,883 | 2/1932 | De Groote . | |
| 2,873,253 | 2/1959 | Stanphill | 252/8.55 |
| 3,077,929 | 2/1963 | Fetkovich et al. | 166/41 |
| 3,241,614 | 3/1966 | Bertness | 166/41 |
| 3,724,552 | 4/1973 | Snavely, Jr. | 166/304 |
| 4,476,113 | 10/1984 | Young | 424/161 |
| 4,476,930 | 10/1984 | Watanabe | 166/279 |
| 4,551,167 | 11/1985 | Young et al. | 71/64.1 |
| 4,726,144 | 2/1988 | Young et al. | 47/58 |
| 4,818,410 | 4/1989 | Bellos et al. | 210/639 |
| 4,864,075 | 9/1989 | Thompson et al. | 558/237 |
| 4,908,142 | 3/1990 | Dumdum et al. | 252/17 |
| 4,908,143 | 3/1990 | Dumdum et al. | 252/17 |
| 4,956,099 | 9/1990 | Thompson et al. | 210/764 |
| 5,013,350 | 5/1991 | Green et al. | 71/65 |
| 5,022,912 | 6/1991 | Young et al. | 71/30 |
| 5,039,327 | 8/1991 | Pilling et al. | 71/27 |
| 5,041,240 | 8/1991 | Green et al. | 252/380 |
| 5,076,358 | 12/1991 | Kissel | 166/275 |
| 5,089,227 | 2/1992 | Thompson et al. | 422/16 |
| 5,089,619 | 2/1992 | Thompson et al. | 544/357 |
| 5,112,505 | 5/1992 | Jacobs et al. | 252/8.552 |
| 5,112,623 | 5/1992 | Green et al. | 424/713 |
| 5,130,473 | 7/1992 | Jacobs et al. | 562/27 |
| 5,165,920 | 11/1992 | Green et al. | 424/78.37 |
| 5,167,966 | 12/1992 | Green et al. | 424/715 |
| 5,190,677 | 3/1993 | Pilling et al. | 252/17 |

FOREIGN PATENT DOCUMENTS 235889  1/1969  U.S.S.R. .
348594  8/1972  U.S.S.R. .

OTHER PUBLICATIONS

Unocal Product Information, IMD–710 Dewaxer, Jun. 1993.
Kissel et al., "Water–Based Tetrathiocarbonates as Specialty Chemicals for Petroleum Production," 13th Annal Pacific Coast Oil Show & Conference, Nov. 8–Oct. 1994.
Roncero et al., Felle u. Seifen 54, 550–5 (1952); cf. C.A. 45, 9281g.
Kazimierz Szadkowski, Wiad. Naft. 1966, 129–31 (1966) (Pol).
Karanth, P. I., Petrol. Hydrocarbons 1970, 5(2), 32–6 (Eng.)., Pub. in Chem. Age India 21(7).
Ruadakova, N. Ya, Khim, Tekhnol, Topl. Maset 1972, 17(1), 15–19 (Russ.).
Rudakova et al., Neft. Gazov. Prom.(1974), (2), 32–4 (Russ).
Chemical Abstracts 88:25290z (1978).
Chemical Abstracts 88:63944y (1978).
Chemical Abstracts 88:107785d (1978).
Chemical Abstracts 90:189466d (1979).
Chemical Abstracts 90:189467e (1979).
Chemical Abstracts 90:189468f (1979).
Chemical Abstracts 90:171121c (1979).
Chemical Abstracts 90:171136m (1979).
Chemical Abstracts 90:171137h (1979).
Chemical Abstracts 91:142930f (1979).
Chemical Abstracts 92:166295z (1980).
Chemical Abstracts 94:14975z (1981).
Chemical Abstracts 95:9554c (1981).
Chemical Abstracts 95:83347d (1981).
Chemical Abstracts 95:222699k (1981).
Chemical Abstracts 97:219235a (1982).
Chemical Abstracts 97:219237u (1982).
Chemical Abstracts 98:125373d (1983).
Chemical Abstracts 98:200964c (1983).
Chemical Abstracts 99:178578b (1983).
Chemical Abstracts 100:9640z (1984).
Chemical Abstracts 102:169536q (1985).

*Primary Examiner*—Richard L. Raymond
*Attorney, Agent, or Firm*—Gregory F. Wirzbicki; Shlomo R. Frieman

[57] ABSTRACT

Compounds selected from the group consisting of urea, urea homologues and analogues, and mixtures thereof are employed to synergistically increase the dewaxing efficacy of aqueous, carbon disulfide precursor (e.g., thiocarbonate)-containing solutions.

36 Claims, No Drawings

METHOD FOR REDUCING THE POUR POINT OF AN OIL AND COMPOSITIONS FOR USE THEREIN

BACKGROUND

The present invention relates to the use of aqueous, carbon disulfide precursor-containing solutions in the production of oil from subterranean formations.

Crude oil production can experience plugging in tubing, wellbores, and flowlines, as well as baggy interfaces in separators and stock tanks. Serious plugging can cause loss of production and equipment failures. These plugs are formed as the gross production leaves the formation, since temperatures and pressures are reduced. The plugging agents can be paraffins, asphaltenes, maltenes, resins, and elemental sulfur.

Additionally, the production of heavy crudes and tar sands is often hampered by the high viscosities encountered. The recovery of residual oil from aged reservoirs is made difficult because the oil-coated rock is usually surrounded by large quantities of brine.

Aqueous, carbon disulfide-containing solutions have been used as dewaxing agents and sulfur deposition inhibitors in the production of oil from subterranean formations. See, for example, U.S. Pat. Nos. 3,724,552 and 5,076,358, these documents being incorporated herein in their entireties by reference.

There is a need to produce oil more efficiently, e.g., by using a more efficacious dewaxing agent.

SUMMARY OF THE INVENTION

The present invention satisfies the need for a more efficacious dewaxing agent by providing solutions comprising (a) one or more carbon disulfide precursors and (b) at least one "urean," which solutions exhibit a synergistic dewaxing efficiency as evidenced by comparative data set forth below in Examples 1–29. (As used in the specification and claims, the term "urean" means a compound selected from the group consisting of urea, urea homologues, and urea analogues.)

The invention also encompasses (a) methods for enhancing the production of oil from a subterranean formation, (b) an oil production system, and (c) an oil handling system. In one embodiment, the enhanced oil production method comprises the step of injecting an aqueous, carbon disulfide precursor- and urean-containing solution into a well penetrating a subterranean formation. In another version, the enhanced oil production method comprises the steps of (i) injecting an aqueous, carbon disulfide precursor-containing solution into a well penetrating a subterranean formation and (iii) injecting an aqueous, urean-containing solution into the well to form the aqueous, carbon disulfide precursor- and urean-containing solution in situ in the well or subterranean formation.

The oil production system comprises (i) an oil-bearing subterranean formation, (ii) a well penetrating at least a portion of the oil-bearing subterranean formation; and (iii) the aqueous, carbon disulfide precursor- and urean-containing solution present in at least a portion of the well. The oil handling system comprises (i) a device for transporting, holding, or processing oil (e.g., flowlines, storage or holding tanks, Wemcos, free-water-knock-outs, heater treaters, gun barrels, API separators, pumps, filters, pipelines, etc.), (ii) oil present in the device, and (iii) the aqueous, carbon disulfide precursor- and urean-containing solution present in the device.

DETAILED DESCRIPTION OF THE INVENTION

The urean employed in the aqueous solutions of the present invention is preferably selected from the group consisting of urea, biuret, methyl urea, ethylene urea, oxyalkylated urea, triuret, formamide, dimethylformamide, acetamide, propionamide, butyramide, valeramide, caproamide, benzamide, acetanilide, and mixtures thereof. (As used in the specification and claims, the term "oxyalkylated urea" means a reaction product of urea with ethylene oxide, propylene oxide, butylene oxide, or a mixture thereof.)

Carbon disulfide precursors include, but are not limited to, thiocarbonates, dithiocarbamates (e.g., disodium ethylenebisdithiocarbamate, disodium hexadecamethylenebisdithiocarbamate), and xanthates (e.g., sodium ethyl xanthate). Methods for preparing dithiocarbamates and xanthates are disclosed in U.S. Pat. No. 3,724,552.

Regarding thiocarbonates, the thiocarbonates used in the process of the present invention generally have the formula I

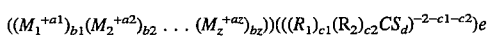

where $M_1$, $M_2$, and $M_z$ are each independently selected from the group consisting of inorganic and organic cations; a1 is the valence of $M_1$; a2 is the valence of $M_2$; az is the valence of $M_z$; each of b1, b2, and bz is 0 or a positive integer (i.e., 1 or a whole number greater than 1), provided that b1+b2+ ... +bz equals a positive integer; $R_1$ and $R_2$ are each independently selected from the group consisting of monovalent organic groups; each of c1 and c2 is 0 or 1; d is at least 3; and e is a positive integer, provided that (a1·b1+a2·b2+ ... +az·bz) equals (2−c1−c2)·e. (As used in the specification and claims, the term "inorganic cation" means a cation devoid of even one carbon atom; the term "organic cation" means a cation containing at least one carbon atom; and the term "organic group" means a group containing at least one carbon atom.) More typically, the thiocarbonates employed in the present invention have the formula II

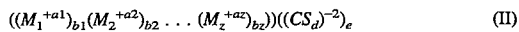

where $M_1$, $M_2$, $M_z$, a1, $a_2$, az, b1, b2, bz, d, and e are as defined above. Most often, the process of the present invention employs thiocarbonates having the formula III

where M is selected from the group consisting of inorganic and organic cations; a is the valence of M; b is a positive integer; d is as defined above; and a·b equals 2. (The discussion in the remaining portion of the specification regarding M is equally applicable to $M_1$, $M_2$, and $M_z$.)

Inorganic cations for M include ammonium ion, alkali metal cations, and zinc, with the preferred inorganic cations being ammonium, sodium, and zinc.

Organic cations include, but are not limited to, compounds having the formula IV

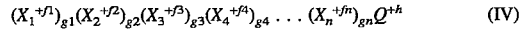

where $X_1$, $X_2$, $X_3$, $X_4$, and $X_n$ are independently selected from the group consisting of hydrogen and $C_1$–$C_{50}$ organic groups; f1 is the valence of $X_1$; f2 is the valence of X2; f3 is the valence of $X_3$; f4 is the valence of $X_4$; fn is the valence of $X_n$; Q is a nonmetal; each of g1, g2, g3, g4, and gn is 0 or 1; and h is the valence of Q, provided that at least one of $X_1$, $X_2$, $X_3$, $X_4$, or $X_n$ is an organic group, the total number of carbon atoms in the organic cation is 1 to 60, and f1+f2+f3+f4+ . . . +fn is a positive integer less than h (generally equal to h–1 or h–2).

The most suitable organic cations have the formula V

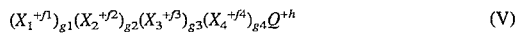 (V)

where $X_1$, $X_2$, $X_3$, $X_4$, Q, and h are as defined above; and each of f1, f2, f3, f4, g1, g2, g3, and g4 is 1.

The organic groups employed for $R_1$, $R_2$, $X_1$, $X_2$, $X_3$, $X_4$, and $X_n$ can be derived from aliphatic, alicyclic, or aromatic compounds, and include straight chain, branched chain, and cyclic structures. The organic groups can be, for example, substituted or unsubstituted alkyl, alkenyl, alkynyl, aryl, arylalkyl, or alkylaryl groups, and can include heteroatoms such as oxygen, sulfur, nitrogen, and phosphorus. Generally, each $R_1$, $R_2$, $X_1$, $X_2$, $X_3$, $X_4$, and $X_n$ comprises up to about 20, preferably up to 12, more preferably up to 8, even more preferably up to 6, and most preferably up to 4, carbon atoms. Each of $R_1$, $R_2$, $X_1$, $X_2$, $X_3$, $X_4$, and $X_n$ is also preferably a hydrocarbyl group (e.g., methyl, ethyl, n-propyl, isopropyl, n-butyl, sec-butyl, t-butyl, isobutyl, hexyl, octyl, phenyl, and benzyl), with the most preferred hydrocarbyl groups being alkyl groups.

The total number of carbon atoms in the organic cation is usually 1 to 40, preferably 1 to 20, more preferably 1 to 10, and most preferably 1 to 8.

Q is preferably nitrogen, phosphorus, arsenic, or antimony, with the corresponding organic cations being primary, secondary, tertiary, and quaternary ammonium, phosphonium, arsonium, and stibonium cations. More preferably, the organic cation is a quaternary ammonium cation.

While the thiocarbonate is preferably a tetrathiocarbonate (d=4), the thiocarbonate can also be a pentathiocarbonate (d=5), a hexathiocarbonate (d=6), and a septathiocarbonate (d=7). In fact, d can be 8 or more.

Thiocarbonates present in the aqueous solution are preferably stabilized with a stabilizing agent selected from the group consisting of bases, sulfur, sulfur-containing compounds, and mixtures thereof. The most preferred stabilized, thiocarbonate solutions used in the present invention contain one or more bases in addition to sulfur and/or one or more sulfur-containing compounds.

The sulfur-containing compounds have a formula selected from the group consisting of $H_2S_i$, $HR_1S_i$, $R_1R_2S_i$, $MHS_i$, $(M^{+a})_bS_i$, and $MR_1S_i$, where M, $R_1$, $R_2$, a, and b are as defined above (provided that a·b equals 2) and i is at least 1. When the sulfide-containing compound is a monosulfide, i is 1, and when the sulfide-containing compound is a polysulfide i is greater than 1. Generally, i is from about 1 to about 5, and preferably 2 to about 5. The sulfur-containing compounds are preferably soluble in the aqueous, thiocarbonate solution, and are more preferably significantly soluble in water. Most preferably, the sulfur-containing compounds are selected from the group consisting of ammonium sulfide, ammonium polysulfides, alkali sulfides, alkali polysulfides, alkaline earth metal sulfides, alkaline earth metal polysulfides, and mixtures thereof.

Virtually any organic or inorganic base can be used as a stabilizing agent. Exemplary organic and inorganic bases are listed in the Handbook of Chemistry and Physics, 65th Edition, Weast el al. Editors, CRC Press, Inc., Boca Raton, Fla. (1984), pages D-163 to D-165 (hereinafter referred to as the "Handbook"), which Handbook is incorporated herein in its entirety by reference. Preferably, the base employed in the present invention is selected from the group consisting of alkali metal hydroxides (especially, sodium hydroxide and potassium hydroxide), alkaline earth metal hydroxides, and ammonium hydroxide.

The stabilizing agent is generally present in the thiocarbonate solution in a sufficient concentration to reduce the vapor pressure of carbon disulfide in the equilibrium vapor phase overlying the solution. The amount of stabilizing agent required to achieve a desired carbon disulfide vapor pressure reduction is easily determined by adding different, known quantities of the stabilizing agent to the thiocarbonate solution, confining the vapor space over the solution at about 24° C. (75.2° F.) for a sufficient period of time, e.g., about 24 hours, and analyzing the vapor phase by gas chromatography for carbon disulfide. Lower additive concentrations will result in somewhat higher $CS_2$ equilibrium concentrations (i.e., higher $CS_2$ partial pressures), and higher additive concentrations will result in lower $CS_2$ partial pressures.

In terms of carbon disulfide partial pressure, the solutions generally have a carbon disulfide partial pressure of about 2 or less, preferably about 1.5 or less, more preferably about 1 or less, even more preferably about 0.5 or less, and most preferably about 0.2 or less, volume percent in the equilibrium vapor phase overlying the solution at about 24° C. (75.2° F.).

Further details regarding stabilized thiocarbonate solutions are contained in U.S. Pat. Nos. 5,041,240, 5,112,623, 5,165,920, 5,167,966, and 5,173,306, these documents being incorporated herein in their entireties by reference.

Methods for synthesizing thiocarbonates are well known to those skilled in the art. See, for example, U.S. Pat. Nos. 4,476,113, 4,551,167, 4,726,144, 5,013,350, 5,022,912, and 5,112,623, these documents being incorporated herein in their entireties by reference, as well as U.S. Pat. Nos. 5,041,240, 5,165,920, 5,167,966, 5,173,306. Preferably, the thiocarbonate is synthesized in accordance with the procedure described in U.S. patent application Ser. No. 08/321, 097, which application is incorporated herein in its entirety by reference.

The thiocarbonate concentration in the thiocarbonate- and urean-containing aqueous solutions of the present invention is commonly at least about 1, preferably at least about 5, more preferably at least about 10, even more preferably at least about 15, and most preferably at least about 20, weight percent. (As used in the specification and claims, the term "weight percent" (in the context of the concentration of a constituent in a solution) means the weight of the constituent divided by the total weight of all solvents and solubilized solutes present in the solution, the quotient being multiplied by 100%.) Typically, the thiocarbonate- and urean-containing aqueous solutions have a thiocarbonate concentration less than about 50, more typically less than about 45, even more typically less than about 40, and most typically less than about 35, weight percent.

While the ratio of the weight percent of carbon disulfide precursor concentration to the weight percent of urean present in the aqueous solution can be as high as 2:1, the ratio is more commonly about 1:1 or less, preferably about 1:1.5 or less, more preferably about 1:2 or less, even more preferably about 1:2.5 or less, and most preferably about 1:3 or less. (Accordingly, the carbon disulfide concentration in the solution is, in general, significantly less than the urean concentration in the solution.) Provided that the foregoing ratio is maintained, the urean is typically employed in the aqueous, carbon disulfide precursor-containing solutions in a concentration of at least about 1, preferably at least about 5, more preferably at least about 10, even more preferably at least about 15, and most preferably at least about 20, weight percent. Commonly, the urean is present in the solution in a concentration of about 45 or less, more commonly about 40 or less, even more commonly about 35 or less, and most commonly about 30 or less, weight percent.

Optionally, the carbon disulfide precursor- and urean-containing, aqueous solutions employed in the present invention contain one or more additional ingredients selected from the group consisting of corrosion inhibitors, surfactants, solvents, and mixtures thereof.

The carbon disulfide precursor- and urean-containing, aqueous solutions are prepared by combining the various constituent ingredients in any convenient order. However, since the addition of urea to water causes an endotherm, the mixing tank is preferably heated during such addition.

The carbon disulfide precursor- and urean-containing, aqueous solutions are used in oil recovery methods in a manner analogous to the techniques described in U.S. Pat. Nos. 3,724,552 and 5,076,358 with respect to prior art carbon disulfide precursor-containing solutions. When employed in a continuous manner, the solutions are commonly used at a rate of about 10 to about 10,000, and preferably about 100 to about 1,000, ppmw of carbon disulfide precursor per barrel of produced crude oil. When periodically used in a batch mode, the solutions are frequently employed at a rate of about 100 to about 10,000, and preferably about per barrel of produced crude oil.

In addition, the aqueous solutions are employed to inhibit the formation of paraffins, asphaltenes, maltenes, resins, and elemental sulfur while transporting, holding, or processing oil. For example, while oil is being pumped through an oil pipeline, the aqueous carbon disulfide precursor- and urean-containing solution is injected into the pipeline. Usually, the aqueous solution is introduced into the pipeline very close to the location where the oil enters the pipeline. Alternatively, the solution is commingled with the oil just before the oil is pumped into the pipeline. While the aqueous solution is optionally injected at one or more locations along the pipeline, it is generally only injected where oil is introduced into the pipeline. When the solution is introduced into the pipeline on a continuous basis, the solution is generally introduced at a rate of about 10 to about 10,000, and preferably about 100 to about 1,000, ppmw of carbon disulfide precursor per barrel of produced crude oil introduced into the pipeline. When introduced into the pipeline on a batch basis, the solution is typically introduced at a rate of about 100 to about 10,000, and preferably about 1,000 to about 10,000, ppmw of carbon disulfide precursor per barrel of produced crude oil introduced into the pipeline.

In an alternative embodiment of the invention, the carbon disulfide precursor- and urean-containing solution is formed in situ in the wellbore, tubing, subterranean formation, flowlines, storage or holding tanks, Wemcos, free-water-knock-outs, heater treaters, gun barrels, API separators, pumps, filters, pipelines, or other device or system for producing, transporting, or other device or system for producing, transporting, holding, or processing oil. In this version of the invention, an aqueous, carbon disulfide precursor-containing solution and an aqueous, urean-containing solution are injected or otherwise introduced (e.g., pumped, poured, mechanically fed, etc.) into the device or system for producing, transporting, holding, or processing oil. The aqueous, carbon disulfide precursor-containing solution and the aqueous, urean-containing solution can be sequentially or simultaneously introduced provided that the above described aqueous, carbon disulfide precursor- and urean-containing solution is formed in situ.

EXAMPLES

The following examples describe tests conducted to determine the capacity of various compounds to enhance the dewaxing efficacy of carbon disulfide precursor-containing solutions.

Examples 1–13

Laboratory Comparative Tests

The crude oil used in this laboratory experiment had an API gravity of about 27.8° and contained about 6.3 weight percent wax and about 2.1 weight percent asphaltenes. The crude oil was part of a produced fluid that contained about 95 weight percent oil and about 5 weight percent water, the water having a pH of about 7.3 and a dissolved brine solids content of about 0.57 weight percent. The pour points were determined using the standard method described in "Pour Point of Petroleum Oils," ASTM D97-66, American Society Testing Materials, Philadelphia, Pa. (1979) ("ASTM D97-66"), ASTM D97-66 being incorporated herein in its entirety by reference. The results of the laboratory experiment are set forth below in Table A.

TABLE A

| Ex | Admixture | Pour Point, °C. | PPD[1], °C. |
|---|---|---|---|
| 1 | Control (untreated oil) | +8 | — |
| 2 | 32 wt % Aq. $Na_2CS_4$ @ 200 ppmw[2] | +2 | 6 |
| 3 | 32 wt % Aq. $Na_2CS_4$ @ 400 ppmw | −4 | 12 |
| 4 | 32 wt % Aq. $Na_2CS_4$ @ 600 ppmw | −6 | 14 |
| 5 | 32 wt % Aq. $Na_2CS_4$ @ 800 ppmw | −7 | 10 |
| 6 | 20 wt % Aq. Urea @ 200 ppmw | +8 | 0 |
| 7 | 20 wt % Aq. Urea @ 400 ppmw | +8 | 0 |
| 8 | 20 wt % Aq. Urea @ 600 ppmw | +7 | 1 |
| 9 | 20 wt % Aq. Urea @ 800 ppmw | +7 | 1 |
| 10 | 32 wt % Aq. $Na_2CS_4$ @ 200 ppmw + 20 wt % Aq. Urea @ 200 ppmw | +1 | 7 |
| 11 | 32 wt % Aq. $Na_2CS_4$ @ 200 ppmw + 20 wt % Aq. Urea @ 400 ppmw | −6 | 14 |
| 12 | 32 wt % Aq. $Na_2CS_4$ @ 200 ppmw + 20 wt % Aq. Urea @ 600 ppmw | −9 | 17 |
| 13 | 32 wt % Aq. $Na_2CS_4$ @ 200 ppmw + 20 wt % Aq. Urea @ 800 ppmw | −11 | 19 |

[1]PPD denotes pour point depression.
[2]ppmw denotes parts per million by weight and is the parts by weight of solute (i.e., $Na_2CS_4$ or urea) per million parts by weight of crude oil.

The results listed in the above Table A demonstrate the unexpected increase in dewaxing efficacy (as indicated by synergistic decreases in pour points) achieved by thiocarbonate- and urea-containing solutions when compared to the efficacies of corresponding

Examples 14–23

Laboratory Comparative Tests

The crude oil and procedure employed in the preceding Examples 1–13 were used to examine the efficacy combinations comprising sodium tetrathiocarbonate and urea or urea derivatives. The results of these tests are reported below in Table B.

TABLE B

| Ex | Admixture | Pour Point, °C. | PPD[1], °C. |
|---|---|---|---|
| 1 | Control (untreated oil) | +8 | — |
| 3 | 32 wt % Aq. Na$_2$CS$_4$ @ 400 ppmw[2] | −4 | 12 |
| 14 | 10 wt % Aq. Urea @ 800 ppmw | +8 | 0 |
| 15 | 32 wt % Aq. Na$_2$CS$_4$ @ 400 ppmw + 10 wt % Aq. Urea @ 400 ppmw | −10 | 18 |
| 16 | 10 wt % Aq. Biuret @ 800 ppmw | +8 | 0 |
| 17 | 32 wt % Aq. Na$_2$CS$_4$ @ 400 ppmw + 10 wt % Aq. Biuret @ 400 ppmw | −10 | 18 |
| 18 | 10 wt % Aq. EO · urea[3] @ 800 ppmw | +7 | 1 |
| 19 | 32 wt % Aq. Na$_2$CS$_4$ @ 400 ppmw + 10 wt % Aq. EO · urea @ 400 ppmw | −11 | 19 |
| 20 | 10 wt % Aq. Methylurea @ 800 ppmw | +8 | 0 |
| 21 | 32 wt % Aq. Na$_2$CS$_4$ @ 400 ppmw + 10 wt % Aq. Methylurea @ 400 ppmw | −10 | 18 |
| 22 | 10 wt % Aq. Ethyleneurea @ 800 ppmw | +7 | 1 |
| 23 | 32 wt % Aq. Na$_2$CS$_4$ @ 400 ppmw + 10 wt % Aq. Ethyleneurea @ 400 ppmw | −11 | 19 |

[1]PPD denotes pour point depression.
[2]ppmw denotes parts per million by weight and is the parts by weight of solute (i.e., Na$_2$CS$_4$ or urea) per million parts by weight of crude oil.
[3]EO · urea denotes a product formed by reacting 2 moles million parts by weight of crude oil.
[3]EO · urea denotes a product formed by reacting 2 moles of ethylene oxide with one mole of urea at about 70° C. and about 790.8 kpascal (100 psig) for about 5 hours.

The results listed in the foregoing Table B show that combinations comprising (a) urea or various water soluble urea derivatives and (b) sodium tetrathiocarbonate exhibit unexpected increases in dewaxing efficacy (as indicated by the synergistic lowering of pour points) in comparison to the efficacies of solutions containing only one of the solutes.

Examples 24–29

Field Comparative Tests

Fluids were produced from an oil well at a rate of about 10 barrels per day. The produced fluids consisted of about 95 weight percent crude oil and about 5 weight percent water, the water having a pH of about 7.3 and a dissolved brine solids content of about 0.57 weight percent. The crude oil had an API gravity of about 27.8° and contained about 6.3 weight percent wax and about 2.1 weight percent asphaltenes. The pour points were determined using the standard method described in ASTM D97-66. The results of the field experiment are set forth below in Table C.

TABLE C

| Ex | Admixture | Pour Point, °C. | PPD[1], °C. |
|---|---|---|---|
| 24 | Control (untreated oil) | +6 | — |
| 25 | 32 wt % Aq. Na$_2$CS$_4$ @ 500 ave. ppmw[2] | −6 | 12 |
| 25 | 32 wt % Aq. Na$_2$CS$_4$ @ 1000 ave. ppmw | −11 | 17 |
| 27 | 32 wt % Aq. Na$_2$CS$_4$ @ 500 ave. ppmw + 20 wt % Aq. Urea @ 250 ave. ppmw | +2 | 4 |
| 28 | 32 wt % Aq. Na$_2$CS$_4$ @ 500 ave. ppmw + 20 wt % Aq. Urea @ 500 ave. ppmw | −8.5 | 14.5 |
| 29 | 32 wt % Aq. Na$_2$CS$_4$ @ 500 ave. ppmw + 20 wt % Aq. Urea @ 1000 ave. ppmw | −18 | 24 |

[1]PPD denotes pour point depression.
[2]ave. ppmw denotes the average parts per million by weight of solute (i.e., Na$_2$CS$_4$ or urea) injected into the well per million parts by weight of crude oil produced from the well.

The results listed in the above Table C show an increase in dewaxing efficacy (as indicated by the lower pour points) achieved by thiocarbonate- and urea-containing solutions of the present invention. In addition, an extra benefit observed by employing the thiocarbonate- and urea-containing solutions was a better oil/water interface within the separators.

Although the present invention has been described in considerable detail with reference to some preferred versions, other versions are possible. Therefore, the spirit and scope of the appended claims should not necessarily be limited to the description of the preferred versions contained herein.

What is claimed is:

1. A method for lowering the pour point of an oil in a system for producing, transporting, holding, or processing the oil, the method comprising the step of forming an aqueous, carbon disulfide precursor- and compound-containing solution in situ in the system by:

(a) introducing an aqueous, carbon disulfide precursor-containing solution into the oil-containing system; and (b) introducing an aqueous, compound-containing solution into the oil-containing system, where the compound is selected from the group consisting of urea, biuret, oxyalkylated urea, methylurea, ethylene urea, triuret, formamide, dimethylformamide, acetamide, propionamide, butyramide, valeramide, caproamide, benzamide, acetanilide, and mixtures thereof, where the ratio of the weight percent of the carbon disulfide precursor to the weight percent of the compound in the solution is less than 2:1.

2. The method of claim 1 where at least a portion of the aqueous, carbon disulfide precursor-containing solution and at least a portion of the aqueous, compound-containing solution are simultaneously introduced into the oil-containing system.

3. The method of claim 1 where the aqueous, carbon disulfide precursor-containing solution and the aqueous, compound-containing solution are sequentially introduced into the oil-containing system.

4. A method for enhancing the production of oil from a subterranean formation, the method comprising the step of injecting an aqueous solution into a well penetrating the subterranean formation, where the aqueous solution comprises a carbon disulfide precursor and a synergistic dewaxing concentration of a compound selected from the group consisting of urea, biuret, oxyalkylated urea, methylurea, ethylene urea, triuret, formamide, dimethylformamide, acetamide, propionamide, butyramide, valeramide, caproamide, benzamide, acetanilide, and mixtures thereof, where the ratio of the weight percent of the carbon disulfide precursor to the weight percent of the compound in the solution is less than 2:1.

5. The method of claim 4 where the solution comprises a synergistic dewaxing concentration of the compound, and the compound is selected from the group consisting of urea, biuret, oxyalkylated urea, methylurea, ethylene urea, and mixtures thereof.

6. The method of claim 4 where the ratio of the weight percent of the carbon disulfide precursor to the weight percent of the compound in the solution is about 1:1 or less.

7. The method of claim 4 where the ratio of the weight percent of the carbon disulfide precursor to the weight percent of the compound in the solution is about 1:1.5 or less.

8. The method of claim 4 where the ratio of the weight percent of the carbon disulfide precursor to the weight percent of the compound in the solution is about 1:2 or less.

9. The method of claim 4 where the ratio of the weight percent of the carbon disulfide precursor to the weight percent of the compound in the solution is about 1:2.5 or less.

10. The method of claim 4 where the ratio of the weight percent of the carbon disulfide precursor to the weight percent of the compound in the solution is about 1:3 or less.

11. The method of claim 6 where the compound is present in the solution in a concentration up to the solubility limit of the compound in the solution.

12. The method of claim 6 where the compound is present in the solution in a concentration of about 1 to about 30 weight percent.

13. The method of claim 6 where the compound is present in the solution in a concentration of about 5 to about 25 weight percent.

14. The method of claim 6 where the compound is present in the solution in a concentration of about 10 to about 20 weight percent.

15. The method of claim 4 where the carbon disulfide precursor is selected from the group consisting of thiocarbonates, thiocarbamates, xanthates, and mixtures thereof.

16. The method of claim 4 where the carbon disulfide precursor comprises a thiocarbonate.

17. The method of claim 4 where the carbon disulfide precursor comprises a thiocarbonate, and the thiocarbonate is present in the solution in a concentration of at least about 1 weight percent.

18. A method for enhancing the production of oil from a subterranean formation, the method comprising the step of injecting an aqueous solution into a well penetrating the subterranean formation, where the aqueous solution comprises at least about 1 weight percent of a carbon disulfide precursor and about 1 to about 45 weight percent of a compound selected from the group consisting of urea, biuret, oxyalkylated urea, methylurea, ethylene urea, triuret, formamide, dimethylformamide, acetamide, propionamide, butyramide, valeramide, caproamide, benzamide, acetanilide, and mixtures thereof, provided that the ratio of the weight percent of the carbon disulfide precursor to the weight percent of the compound is less than 2:1.

19. The method of claim 18 where the ratio of the weight percent of the carbon disulfide precursor to the weight percent of the compound in the solution is about 1:1 or less.

20. The method of claim 18 where the ratio of the weight percent of the carbon disulfide precursor to the weight percent of the compound in the solution is about 1:1.5 or less.

21. The method of claim 18 where the ratio of the weight percent of the carbon disulfide precursor to the weight percent of the compound in the solution is about 1:2 or less.

22. The method of claim 18 where the ratio of the weight percent of the carbon disulfide precursor to the weight percent of the compound in the solution is about 1:2.5 or less.

23. The method of claim 18 where the ratio of the weight percent of the carbon disulfide precursor to the weight percent of the compound in the solution is about 1:3 or less.

24. The method of claim 18 where the aqueous solution comprises at least about 5 weight percent of the carbon disulfide precursor.

25. The method of claim 18 where the aqueous solution comprises at least about 10 weight percent of the carbon disulfide precursor.

26. The method of claim 18 where the aqueous solution comprises at least about 15 weight percent of the carbon disulfide precursor.

27. The method of claim 18 where the aqueous solution comprises at least about 20 weight percent of the carbon disulfide precursor.

28. The method of claim 18 where the aqueous solution comprises about 5 to about 40 weight percent of the compound.

29. The method of claim 18 where the aqueous solution comprises about 10 to about 35 weight percent of the compound.

30. The method of claim 18 where the aqueous solution comprises about 15 to about 30 weight percent of the compound.

31. The method of claim 18 where the carbon disulfide precursor comprises a thiocarbonate, the aqueous solution comprises at least about 5 weight percent of the thiocarbonate and about 5 to about 40 weight percent of the compound, and the ratio of the weight percent of the thiocarbonate to the weight percent of the compound is about 1:1 or less.

32. The method of claim 18 where the carbon disulfide precursor comprises a thiocarbonate, the aqueous solution comprises at least about 10 weight percent of the thiocarbonate and about 10 to about 35 weight percent of the compound, and the ratio of the weight percent of the thiocarbonate to the weight percent of the compound is about 1:1.5 or less.

33. The method of claim 18 where the carbon disulfide precursor comprises a thiocarbonate, the aqueous solution comprises at least about 15 weight percent of the thiocarbonate and about 15 to about 30 weight percent of the compound, and the ratio of the weight percent of the thiocarbonate to the weight percent of the compound is about 1:2 or less.

34. The method of claim 18 where the carbon disulfide precursor comprises a thiocarbonate, the aqueous solution comprises at least about 20 weight percent of the thiocarbonate and about 20 to about 30 weight percent of the compound, and the ratio of the weight percent of the thiocarbonate to the weight percent of the compound is about 1:2.5 or less.

35. A method for processing oil comprising the steps of:
(a) processing oil by means of a device; and
(b) injecting into the device an aqueous solution comprising (i) a carbon disulfide precursor and (ii) a compound selected from the group consisting of urea, biuret, oxyalkylated urea, methylurea, ethylene urea, triuret, formamide, dimethylformamide, acetamide, propionamide, butyramide, valeramide, caproamide, benzamide, acetanilide, and mixtures thereof, where the ratio of the weight percent of the carbon disulfide precursor to the weight percent of the compound in the solution is less than 2:1.

36. An oil processing system comprising a device for processing oil and present in the device are oil and an aqueous solution comprising (i) a carbon disulfide precursor and (ii) a compound selected from the group consisting of urea, biuret, oxyalkylated urea, methylurea, ethylene urea, triuret, formamide, dimethylformamide, acetamide, propionamide, butyramide, valeramide, caproamide, benzamide, acetanilide, and mixtures thereof, where the ratio of the weight percent of the carbon disulfide precursor to the weight percent of the compound in the solution is less than 2:1.

* * * * *